US011508387B2

(12) United States Patent
Iyer et al.

(10) Patent No.: US 11,508,387 B2
(45) Date of Patent: Nov. 22, 2022

(54) SELECTING AUDIO NOISE REDUCTION MODELS FOR NON-STATIONARY NOISE SUPPRESSION IN AN INFORMATION HANDLING SYSTEM

(71) Applicant: Dell Products L.P., Round Rock, TX (US)

(72) Inventors: Vivek Viswanathan Iyer, Austin, TX (US); Michael S. Gatson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 291 days.

(21) Appl. No.: 16/996,476

(22) Filed: Aug. 18, 2020

(65) Prior Publication Data
US 2022/0059112 A1  Feb. 24, 2022

(51) Int. Cl.
*G10L 21/02* (2013.01)
*G10L 21/0216* (2013.01)
*G06N 20/00* (2019.01)

(52) U.S. Cl.
CPC .......... *G10L 21/0216* (2013.01); *G06N 20/00* (2019.01); *G10L 2021/02163* (2013.01)

(58) Field of Classification Search
None
See application file for complete search history.

(56) References Cited

U.S. PATENT DOCUMENTS

| | | | |
|---|---|---|---|
| 9,886,954 B1 * | 2/2018 | Meacham | G10L 25/84 |
| 10,235,128 B2 * | 3/2019 | Vaughn | G06N 20/00 |
| 10,869,154 B2 * | 12/2020 | Bruser | H04R 5/033 |
| 11,276,384 B2 * | 3/2022 | Woodruff | H04R 1/1008 |
| 2015/0179184 A1 * | 6/2015 | Cudak | G10L 21/0208 704/233 |
| 2016/0019904 A1 * | 1/2016 | Charette | G10L 25/48 704/227 |
| 2016/0049161 A1 * | 2/2016 | Tsujikawa | H04R 3/005 381/94.7 |
| 2016/0149547 A1 * | 5/2016 | Rider | H03G 3/3005 381/57 |

(Continued)

*Primary Examiner* — Douglas Godbold
(74) *Attorney, Agent, or Firm* — McDermott Will & Emery LLP (57) ABSTRACT

Selecting audio noise reduction models for noise suppression in an information handling system (IHS), including performing calibration and configuration of an audio noise reduction selection model, including: identifying contextual data associated with contextual inputs to the IHS; training, based on the contextual data, the audio noise reduction selection model, including generating a configuration policy including configuration rules, the configuration rules for performing actions for selection of a combination of audio noise reduction models to reduce combinations of noise sources associated with the IHS; performing steady-state monitoring of the IHS, including: monitoring the contextual inputs of the IHS, and in response, accessing the audio noise reduction selection model, identifying configuration rules based on the monitored contextual inputs, applying the configuration rules to select a particular combination of audio noise reduction models, applying particular combination of audio noise reduction models to reduce a particular combination of noise sources associated with the IHS.

20 Claims, 4 Drawing Sheets

(56) References Cited

U.S. PATENT DOCUMENTS

| | | | |
|---|---|---|---|
| 2016/0174001 A1* | 6/2016 | Ungstrup | H04R 25/505 381/315 |
| 2016/0240210 A1* | 8/2016 | Lou | G10L 21/0232 |
| 2018/0350380 A1* | 12/2018 | Kim | G10L 25/78 |
| 2020/0236466 A1* | 7/2020 | Zhao | H04R 1/1041 |

* cited by examiner

SELECTING AUDIO NOISE REDUCTION MODELS FOR NON-STATIONARY NOISE SUPPRESSION IN AN INFORMATION HANDLING SYSTEM

BACKGROUND

Field of the Disclosure

The disclosure relates generally to an information handling system, and in particular, selecting audio noise reduction models for non-stationary noise suppression in an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Immersive productivity focuses on creating an immersive environment that allows a user of an information handling system to stay in his/her work flow. The creation of the immersive environment centers on the elimination of external distractions, providing assistance to the user on key tasks, and augmented capabilities to improve productivity. The elimination of distractions includes blocking interruptions such as notifications and alerts, as well as providing indications such as do-not-disturb to other parties. Assistance to the user includes contextually-driven actions and performance enhancements based on the users' current tasks.

SUMMARY

Innovative aspects of the subject matter described in this specification may be embodied in method for selecting audio noise reduction models for non-stationary noise suppression in an information handling system, including performing at a first time, a calibration and configuration of an audio noise reduction selection model, including identifying contextual data associated with contextual inputs to the information handling system, the contextual data including user settings contextual data, system settings contextual data, and environmental settings contextual data; training, based on the contextual data, the audio noise reduction selection model, including generating a configuration policy including configuration rules, the configuration rules for performing computer-implemented actions for selection of a combination of audio noise reduction models executing on the information handling system to reduce combinations of non-stationary noise sources associated with the information handling system; performing, at a second time, a steady-state monitoring of the information handling system, including: monitoring the contextual inputs of the information handling system; and in response to monitoring the contextual inputs: i) accessing the audio noise reduction selection model including the configuration policy, ii) identifying one or more of the configuration rules based on the monitored contextual inputs, iii) applying the one or more configuration rules to perform one or more of the computer-implemented actions to select a particular combination of audio noise reduction models executing on the information handling system, and iv) applying the particular combination of audio noise reduction models to reduce a particular combination of non-stationary noise sources associated with the information handling system.

Other embodiments of these aspects include corresponding systems, apparatus, and computer programs, configured to perform the actions of the methods, encoded on computer storage devices.

These and other embodiments may each optionally include one or more of the following features. For instance, applying the particular combination of audio noise reduction models to reduce the particular combination of non-stationary noise sources associated with the information handling system includes applying the particular combination of audio noise reduction models to perform noise cancellation of the particular combination of non-stationary noise sources. Applying the particular combination of audio noise reduction models to reduce the particular combination of non-stationary noise sources associated with the information handling system includes applying the particular combination of audio noise reduction models to perform input noise cancellation of the particular combination of non-stationary noise sources. Applying the particular combination of audio noise reduction models to reduce the particular combination of non-stationary noise sources associated with the information handling system includes applying the particular combination of audio noise reduction models to perform output noise cancellation of the particular combination of non-stationary noise sources. Monitoring the contextual inputs includes identifying a location of the information handling system. Monitoring the contextual inputs including identifying a current time. Monitoring the contextual inputs includes identifying environment ambient noise levels. Monitoring the contextual inputs includes identifying audio input source. Monitoring the contextual inputs includes identifying a computer-application being executed by the information handling system. Each audio noise reduction model reduces a particular non-stationary noise source associated with the information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for the identification and application of noise reduction models based on contextual information. Specifically, when implementing an audio application (e.g., video conferencing), noise interference can be present that can hinder use of the audio application by the user. Audio noise interference can affect the quality of voice and/or speech, not only for conferencing audio applications, but also for communications between the user and the information handling system (speech to text, voice commands). An audio noise reduction selection computing module can identify, based on a trained system and contextual information, audio noise reduction models and implement/apply such audio noise reduction models to suppress and/or minimize the audio noise interference.

For example, the audio noise reduction selection computing module can identify and predict, based on the user's environment, context, and behavior, the likely sources of non-stationary noises that occur, and enable accurate suppression of the noises by loading the correct (combination of) audio noise reduction models. In other words, the audio noise reduction selection computing module can learn, reinforce, and contextually switch audio noise reduction models to be implemented at the information handling system to suppress and/or minimize one or more stationary noises, based on user, environmental, system, and session attributes.

Specifically, this disclosure discusses selecting audio noise reduction models for non-stationary noise suppression in an information handling system, including performing, by an audio noise reduction selection computing module and at a first time, a calibration and configuration of an audio noise reduction selection model, including: identifying contextual data associated with contextual inputs to the information handling system, the contextual data including user settings contextual data, system settings contextual data, and environmental settings contextual data; training, based on the contextual data, the audio noise reduction selection model, including generating a configuration policy including configuration rules, the configuration rules for performing computer-implemented actions for selection of a combination of audio noise reduction models executing on the information handling system to reduce combinations of non-stationary noise sources associated with the information handling system; performing, by the audio noise reduction selection computing module at a second time, a steady-state monitoring of the information handling system, including: monitoring the contextual inputs of the information handling system; and in response to monitoring the contextual inputs: i) accessing the audio noise reduction selection model including the configuration policy, ii) identifying one or more of the configuration rules based on the monitored contextual inputs, iii) applying the one or more configuration rules to perform one or more of the computer-implemented actions to select a particular combination of audio noise reduction models executing on the information handling system, and iv) applying the particular combination of audio noise reduction models to reduce a particular combination of non-stationary noise sources associated with the information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Figure 1:
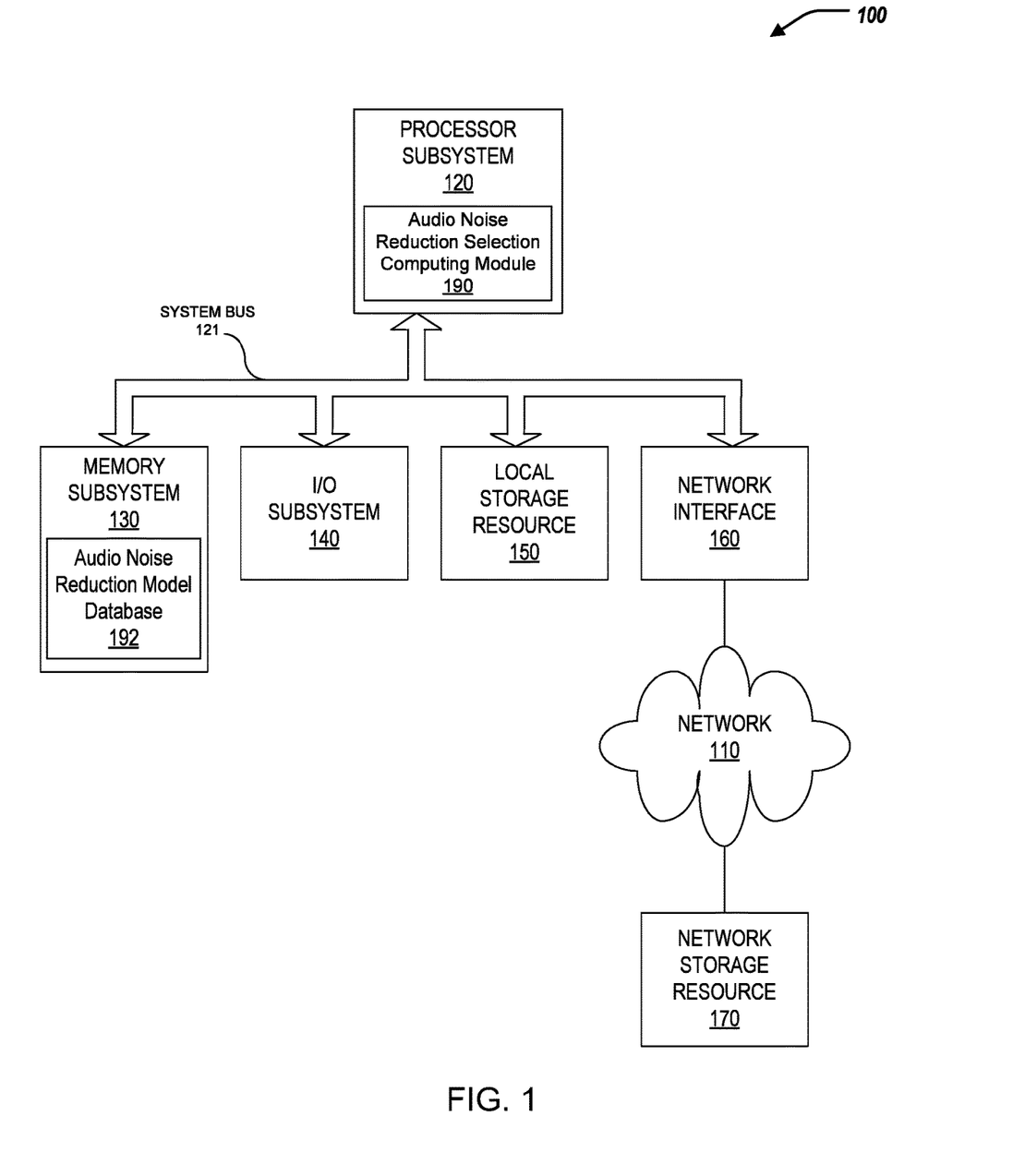
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include an audio noise reduction selection computing module 190. The audio noise reduction selection computing module 190 can be included by the processor subsystem 120. The information handling system 100 can also include an audio noise reduction model database 192. The audio noise reduction model database 192 can be included by the memory subsystem 130.

In short, a user of the information handling system 100 can implement an audio application that is executing at the information handling system 100 (e.g., implementing voice and speech communications at the information handling system 100). However, when implementing the audio application, noise interference can be present hindering use of the audio application by the user. Audio noise interference can affect the quality of voice and/or speech, not only for conferencing audio applications, but also for communications between the user and the information handling system (speech to text, voice commands).

The audio noise reduction model database 192 can include audio noise reduction models. Each audio noise reduction model stored by the audio noise reduction model database 192 can be associated with a particular non-stationary noise source. Specifically, the audio noise reduction selection computing module 190 can implement/apply one or more of the audio noise reduction models stored by the audio noise reduction model database 192 to suppress and/or minimize one or more non-stationary noises.

To that end, the audio noise reduction selection computing module 190 can identify and predict, based on the user's environment, context, and behavior, the likely sources of the non-stationary noises that occur, and enable accurate suppression of the noises by applying the correct audio noise reduction models. In other words, the audio noise reduction selection computing module 190 can learn, reinforce, and contextually switch audio noise reduction models to be implemented at the information handling system 100 to suppress and/or minimize one or more stationary noises, based on user, environmental, system, and session attributes.

Figure 2:
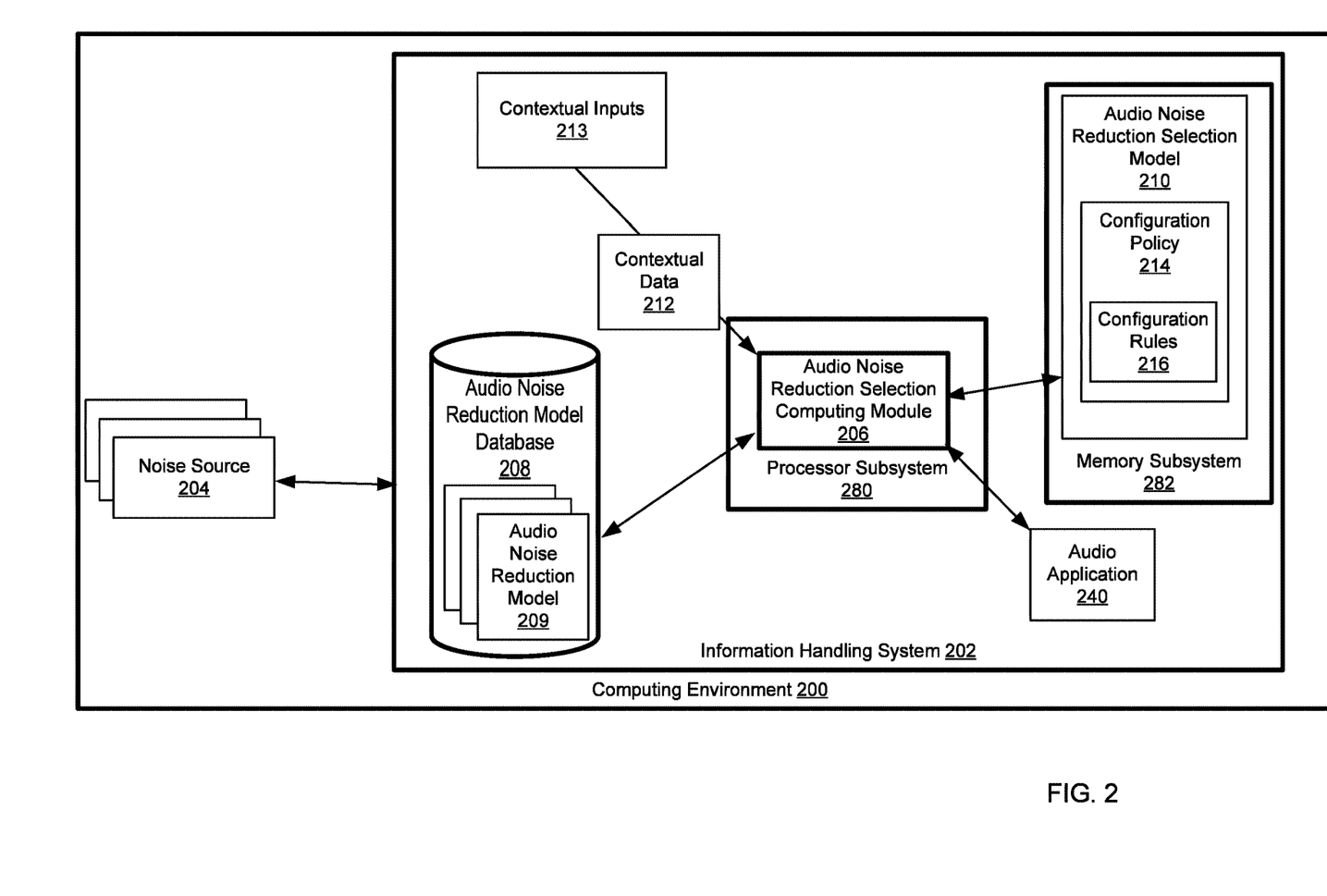
FIG. 2 illustrates a block diagram of an information handling system for selecting audio noise reduction models for non-stationary noise suppression in the information handling system.

Turning to FIG. 2, FIG. 2 illustrates a computing environment 200 including an information handling system 202. The information handling system 202 can include an audio noise reduction selection computing module 206 included by a processor subsystem 280 and an audio noise reduction model database 208. The audio noise reduction selection computing module 206 can be in communication with the audio noise reduction model database 208. In some examples, the IHS 202 is similar to, or includes, the information handling system 100 of FIG. 1. In some examples, the processor subsystem 280 is the same, or substantially the same, as the processor subsystem 120 of FIG. 1. In some examples, the audio noise reduction selection computing module 206 is the same, or substantially the same, as the audio noise reduction selection computing module 190 of FIG. 1. In some examples, the audio noise reduction model database 208 is the same, or substantially the same, as the audio noise reduction model database 192 of FIG. 1.

The audio noise reduction model database 208 can store a plurality of audio noise reduction models 209 (e.g., tens or hundreds of noise reduction models). Each of the audio noise reduction models 209 can be associated with a particular non-stationery noise source 204. The noise sources 204 can be non-stationary noises associated with an environment of the information handling system 202 (e.g., ambient noises) and/or the computing environment 200. For example, the non-stationary noises from the noise sources 204 can be unexpected (or atypical noises) associated with the environment of the information handling system 202. Each audio noise reduction model 209 can reduce, when applied, a particular non-stationary noise source 204.

In short, the audio noise reduction selection computing module 206 can suppress and/or minimize noise sources 204. As described further herein, the audio noise reduction selection computing module 206 can identify, based on learned contextual information of the information handling system 202, a subset of the audio noise reduction models 209. The audio noise reduction selection computing module 206 can then apply the subset of the audio noise reduction models 209 to suppress/minimize the non-stationary noises from the noise source 204, described further herein.

In some implementations, the audio noise reduction selection computing module 206 can perform, at a first time, a calibration and configuration of an audio noise reduction selection model 210, stored by a memory subsystem 282. Specifically, performing of the calibration and the configuration of the audio noise reduction selection model 210 can include identifying contextual data 212 associated with contextual inputs 213 of the information handling system 202. Specifically, the contextual data 212 can include such contextual data as user settings contextual data, system settings contextual data, and environment settings contextual data. In some examples, the memory subsystem 282 is the same, or substantially the same, as the memory subsystem 130 of FIG. 1.

For example, the user settings contextual data of the contextual data 212 can include such contextual data as a specific audio application 240 that is being executed (active) by the information handling system 202 (e.g., a presentation application, an audio conferencing application, a video conferencing application) and a duration of such execution (e.g., session length). The contextual data 212 can include calendaring information associated with the user of the information handling system 202 and the information handling system 202. That is, the user can have appointments/meetings associated with specific dates and times that serve as the contextual data 212.

For example, the system settings contextual data of the contextual data 212 can include such contextual data as a physical location of the information handling system 202, and a current time associated with the information handling system 202. The contextual data 212 can include system settings of the information handling system 202 (e.g., audio/video/speech system settings). The contextual data 212 can include such contextual data as types of devices/peripherals coupled/connected to the information handling system 202. The contextual data 212 can include a power state of the information handling system 202 (e.g., AC and/or DC state, battery state of charge). The contextual data 212 can include an audio input source (e.g., associated with the audio application 240).

For example, the environmental settings contextual data of the contextual data 212 can include such contextual data as ambient/environmental sounds (ambient/environmental noise levels) and ambient/environmental lighting associated with the environment of the information handling system 202. The contextual data 212 can further include other environmental parameters such as weather proximate to the location of the information handling system 202 (e.g., thunder, rain sounds).

In some implementations, the audio noise reduction selection computing module 206 can train, based on the contextual data 212, the audio noise reduction selection model 210. Specifically, the audio noise reduction selection computing module 206 can generate, based on the contextual data 212 identified at the first time, a configuration policy 214 that includes configuration rules 216. In some examples, the configuration rules 216 are rules for performing computer-implemented actions for selection of a combination of audio noise reduction models 209 executing on the information handling system 202 to reduce combinations of non-stationary noise sources 204 associated with the information handling system 202. In some examples, the configuration rules 216 are rules for accessing the audio noise reduction model database 208, identifying and selecting a subset of the audio noise reduction models 209 as stored by the audio noise reduction model database 208 based on the contextual data 212 to reduce combinations of non-stationary noise sources 204 associated with the information handling system 202 (e.g., without user input, independent of user input).

To that end, the audio noise reduction selection computing module 206 can train the audio noise reduction selection model 210 to establish connections between the contextual data 212 and the configuration rules 216. Specifically, the audio noise reduction selection model 210 can identify one or more configurations rules 216 to be applied based on a connection with the one or more of the contextual data 212. In some examples, the audio noise reduction selection computing module 206 can train the audio noise reduction selection model 210 using a machine learning process, and/or a neural network (e.g., a convolution neural network).

For example, the audio noise reduction selection computing module 206 can identify contextual data 212 that indicates during a calendared videoconferencing event for a user of the information handling system 202 (user associated with the information handling system 202) at 4 pm on Monday for 1 hour, the noise sources 204 include i) a train whistle of a train that passes by at approximately 4:30 pm on Monday's, and ii) a dog bark that occurs shortly after the train whistle. The audio noise reduction selection computing module 206 can train the audio noise reduction selection model 210 to establish connections between this particular contextual data 212 and the configuration rules 216. Specifically, the audio noise reduction selection model 210 can establish a particular configuration rule 216 associating the contextual data 212 of a calendared event for 4 pm on Mondays for a hour involving a videoconferencing application with a subset of the audio noise reduction models 209 for the noise sources 204 of i) a train whistle and ii) a dog bark.

For example, the audio noise reduction selection computing module 206 can identify contextual data 212 that indicates when the information handling system 202 is physically located at a coffee shop, the audio application 240 being executed is a dictation audio application, and the audio input source is an internal microphone to the information handling system 202, and the noise sources 204 include i) a cappuccino machine and ii) low-level crowd human voices. The audio noise reduction selection computing module 206 can train the audio noise reduction selection model 210 to establish connections between this particular contextual data 212 and the configuration rules 216. Specifically, the audio noise reduction selection model 210 can establish a particular configuration rule 216 associating the contextual data 212 of the physical location of the coffee shop and utilizing the dictation audio application and internal microphone as the audio input source with a subset of the audio noise reduction models 209 for the noise sources 204 of i) a cappuccino machine and ii) low-level crowd human voices.

In some examples, the non-stationary noise sources 204 are external to the computing environment 200. Specifically, referring to FIG. 3, the information handling system 202 can be in communication with an additional information handling system 302 of an additional computing environment 300. Moreover, the additional computing environment 300 can include noise sources 304 that are associated with the additional information handling system 302, similar to the noise sources 204 of FIG. 2. For example, the audio noise reduction selection computing module 206 can identify contextual data 212 that indicates that calendaring information indicates that the user of the information handling system 202 (user associated with the information handling system 202) has a conference call at 3 pm on Tuesday, the audio application 240 will be a video conferencing application, that the meeting will be with a user of the additional information handling system 302 (user associated with the information handling system 302), and the noise sources 204 include i) a lawn mower and ii) a dog bark. The audio noise reduction selection computing module 206 can train the audio noise reduction selection model 210 to establish connections between this particular contextual data 212 and the configuration rules 216. Specifically, the audio noise reduction selection model 210 can establish a particular configuration rule 216 associating the contextual data 212 of a calendared event for 3 pm on Tuesdays involving a videoconferencing application conducted with the additional information handling system 302 with a subset of the audio noise reduction models 209 for the noise sources 204 of i) a lawn mower and ii) a dog bark.

In some implementations, the audio noise reduction selection computing module 206 can perform, at a second time after the first time, a steady-state monitoring of the information handling system 202. In other words, the audio noise reduction selection computing module 206 can monitor the information handling system 202, and in particular, the contextual inputs 213, for computer-related events that could trigger activation of the configuration rules 216 by the audio noise reduction selection computing module 206.

Specifically, the audio noise reduction selection computing module 206 can monitor the contextual inputs 213 of the information handling system 202. In some examples, the audio noise reduction selection computing module 206 can monitor the contextual data 212 such as user settings contextual data, system settings contextual data, and environment settings contextual data. For example, the audio noise reduction selection computing module 206 can monitor execution of the audio application 240 and a duration of such execution; calendaring information (calendar metadata); a physical location of the information handling system 202; a current time associated with the information handling system 202; system settings (audio/video/speech system settings) of the information handling system 202; types of devices/peripherals coupled/connected to the information handling system 202; a power state of the information handling system 202; an audio input source associated with the execution of the audio application 240; ambient noise levels and ambient lighting levels associated with the information handling system 202; and ambient weather conditions proximate to the location of the information handling system 202.

In some implementations, the audio noise reduction selection computing module 206 can, in response to monitoring the contextual inputs 213, access the audio noise reduction selection model 210 including the configuration policy 214. The audio noise reduction selection computing module 206 can further identify one or more of the configuration rules 216 based on the monitored contextual inputs 213. Furthermore, the audio noise reduction selection computing module 206 can apply the configuration rules 216 to the information handling system 202. In other words, the audio noise reduction selection computing module 206 can apply appropriate configuration rules 216 based on the monitored contextual inputs 213 as provided by the audio noise reduction selection model 210.

In some examples, the audio noise reduction selection computing module 206 can apply the configuration rules 216 to automatically perform one or more computer-implemented actions for selection of a combination of audio noise reduction models 209 executing on the information handling system 202 to reduce combinations of non-stationary noise sources 204 associated with the information handling system 202. That is, the audio noise reduction selection computing module 206 can apply the configuration rules 216 to identify a subset of the audio noise reduction models 209 based on the monitored contextual inputs 213. For example, the audio noise reduction selection computing module 206 can identify the particular configuration rule 216 that corresponds to the monitored contextual input 213. The particular configuration rule 216 can be associated with a particular combination of audio noise reduction models 209. The audio noise reduction selection computing module 206 can apply the configuration rules 216 to perform computer-implemented actions to select the subset of the audio noise reduction models 209 as the particular combination of audio noise reduction models 209 based on the monitored contextual inputs 213. The particular combination of audio noise reduction models 209 reduces a particular combination of non-stationary noise sources 204, as discussed further herein.

To that end, the audio noise reduction selection computing module 206 can apply the combination of audio noise reduction models 209 to reduce the particular combination of non-stationary noise sources 204. That is, based on the monitored contextual inputs 213, the audio noise reduction selection computing module 206 can select the combination of audio noise reduction models 209 to apply to reduce the particular combination of non-stationary noise sources 204. In some examples, applying the combination of audio noise reduction models 209 to reduce the particular combination of non-stationary noise sources 204 includes performing noise cancellation of the particular combination of non-stationary noise sources 204. That is, based on the monitored contextual inputs 213, the audio noise reduction selection computing module 206 can select the combination of audio noise reduction models 209 to apply to perform noise cancellation of the particular combination of non-stationary noise sources 204.

In some examples, the audio noise reduction selection computing module 206 applies the particular combination of audio noise reduction models 209 to perform input noise cancellation of the particular combination of non-stationary noise sources 204.

For example, the audio noise reduction selection computing module 206 can monitor the contextual inputs 213 and determine that the contextual data 212 indicates that the calendaring information indicates that i) the user of the information handling system 202 (user associated with the information handling system 202) has a conference call at 4 pm on Monday ii) the audio application 240 for the conference call will be a video conferencing application, iii) and that the meeting will last 1 hour. The contextual data 212 can further indicate that particular noise sources 204 (e.g., environmental sounds) typically occur at 4:30 pm on Mondays. For example, the particular noise sources 204 can be i) a train whistle of a train that passes by at approximately 4:30 pm on Monday's, and ii) a dog bark that occurs shortly after the train whistle. In response, the audio noise reduction selection computing module 206 can access the audio noise reduction selection model 210, identify the configuration rules 216 that are applicable to the contextual data 212 of a calendared event for 4 pm on Mondays for a hour involving a videoconferencing application, and apply such configuration rules 216. For example, the audio noise reduction selection computing module 206 can applying configuration rules 216 such as identifying the subset of the audio noise reduction models 209 for the noise sources 204 of i) a train whistle and ii) a dog bark; and applying such audio noise reduction models 209 to perform noise cancellation of the particular combination of non-stationary noise sources 204 of the i) train whistle and ii) the dog bark.

For example, the audio noise reduction selection computing module 206 can monitor the contextual inputs 213 and determine that the contextual data 212 indicates that i) the information handling system 202 is located at a coffee shop, ii) the audio application 240 being executed is a dictation audio application, and iii) the audio input source is an internal microphone to the information handling system 202. In response, the audio noise reduction selection computing module 206 can access the audio noise reduction selection model 210, identify the configuration rules 216 that are applicable to the contextual data 212 of a coffee house physical location, dictation audio application, and internal microphone for audio input source and apply such configuration rules 216. For example, the audio noise reduction selection computing module 206 can apply configuration rules 216 such as identifying the subset of the audio noise reduction models 209 for the noise sources 204 of i) a cappuccino machine and ii) low-level crowd human voices; and applying such audio noise reduction models 209 to perform noise cancellation of the particular combination of non-stationary noise sources 204 of i) the cappuccino machine and ii) the low-level crowd human voices.

In some examples, as mentioned above, the non-stationary noise sources 204 are external to the computing environment 200. That is, the audio noise reduction selection computing module 206 applies the particular combination of audio noise reduction models 209 to perform output noise cancellation of the particular combination of non-stationary noise sources 204. Specifically, referring to FIG. 3, the information handling system 202 can be in communication with the additional information handling system 302 of the additional computing environment 300. Moreover, the environment 300 can include the noise sources 304 that are associated with the additional information handling system 302, similar to the noise source 204 of FIG. 2.

Figure 3:
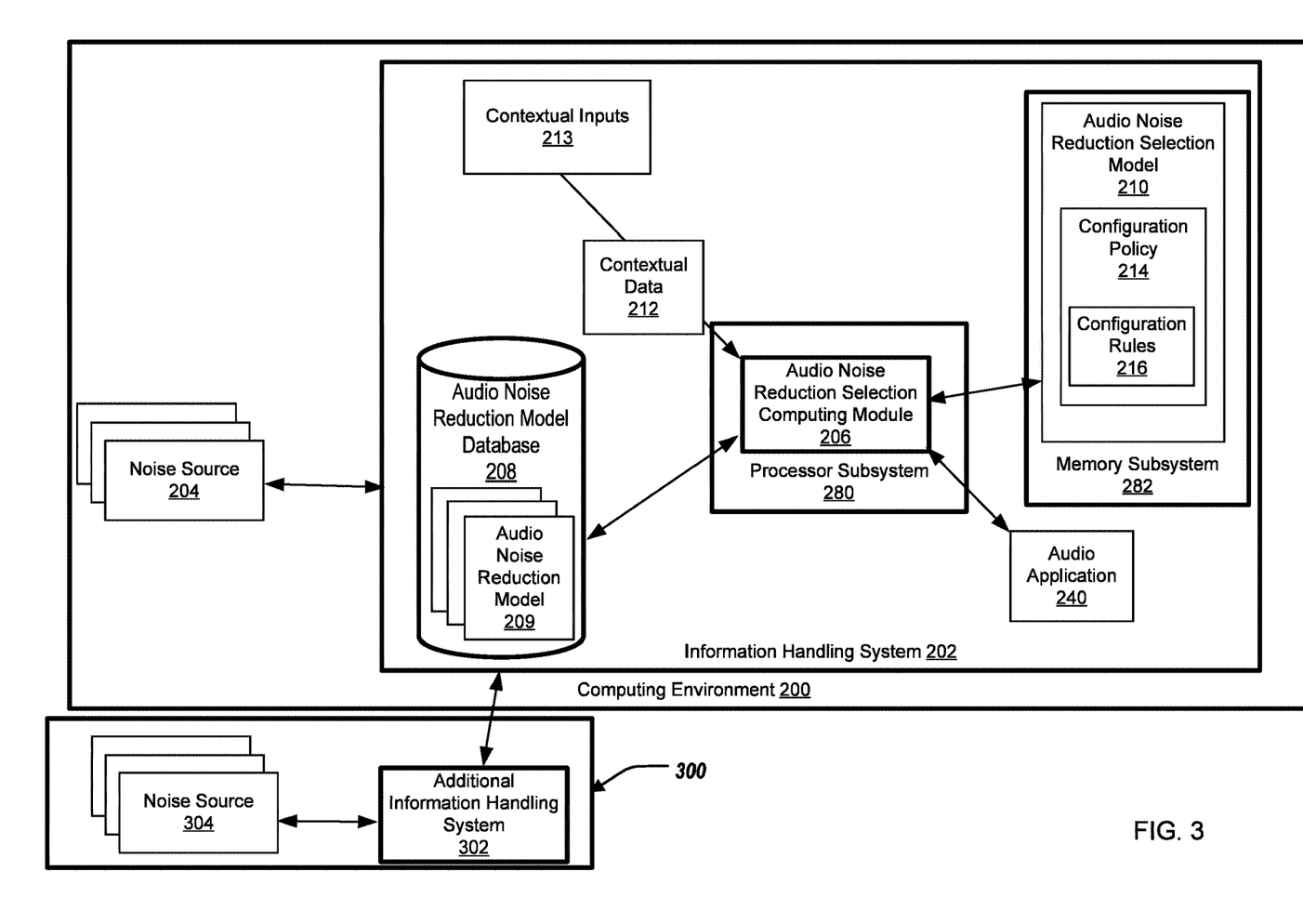
FIG. 3 illustrates a block diagram of the information handling system for selecting audio noise reduction models for non-stationary noise suppression in the information handling system, in a further implementation.

In an example, a user of the information handling system 202 can be engaged with a videoconference with a user of the additional information handling system 302. However, the additional information handling system 302 lacks the computing resources to provide noise cancellation of the noise source 304 when conducting the videoconference. Thus, the videoconference audio provided by the additional information handling system 302 is received by the information handling system 202, including the non-stationary noise sources 304.

To that end, the audio noise reduction selection computing module 206 can monitor the contextual inputs 213 and determine that the contextual data 212 indicates that that the calendaring information indicates that i) the user of the information handling system 202 has a conference call at 3 pm on Tuesday, ii) the audio application 240 for the conference call will be a video conferencing application, and iii) that the meeting will be with a user of the additional information handling system 302 (user associated with the information handling system 302). In response, the audio noise reduction selection computing module 206 can access the audio noise reduction selection model 210, identify the configuration rules 216 that are applicable to the contextual data 212 of that the calendaring information indicates that i) the user of the information handling system 202 has a conference call at 3 pm on Tuesday, ii) the audio application 240 for the conference call will be a video conferencing application, and iii) that the meeting will be with a user of the additional information handling system 302 (user associated with the information handling system 302) and apply such configuration rules 216. For example, the audio noise reduction selection computing module 206 can applying configuration rules 216 such as identifying the subset of the audio noise reduction models 209 for the noise sources 204 of i) a lawn mower and ii) a dog bark; and applying such audio noise reduction models 209 to perform noise cancellation of the particular combination of non-stationary noise sources 204 of i) a lawn mower and ii) a dog bark.

Figure 4:
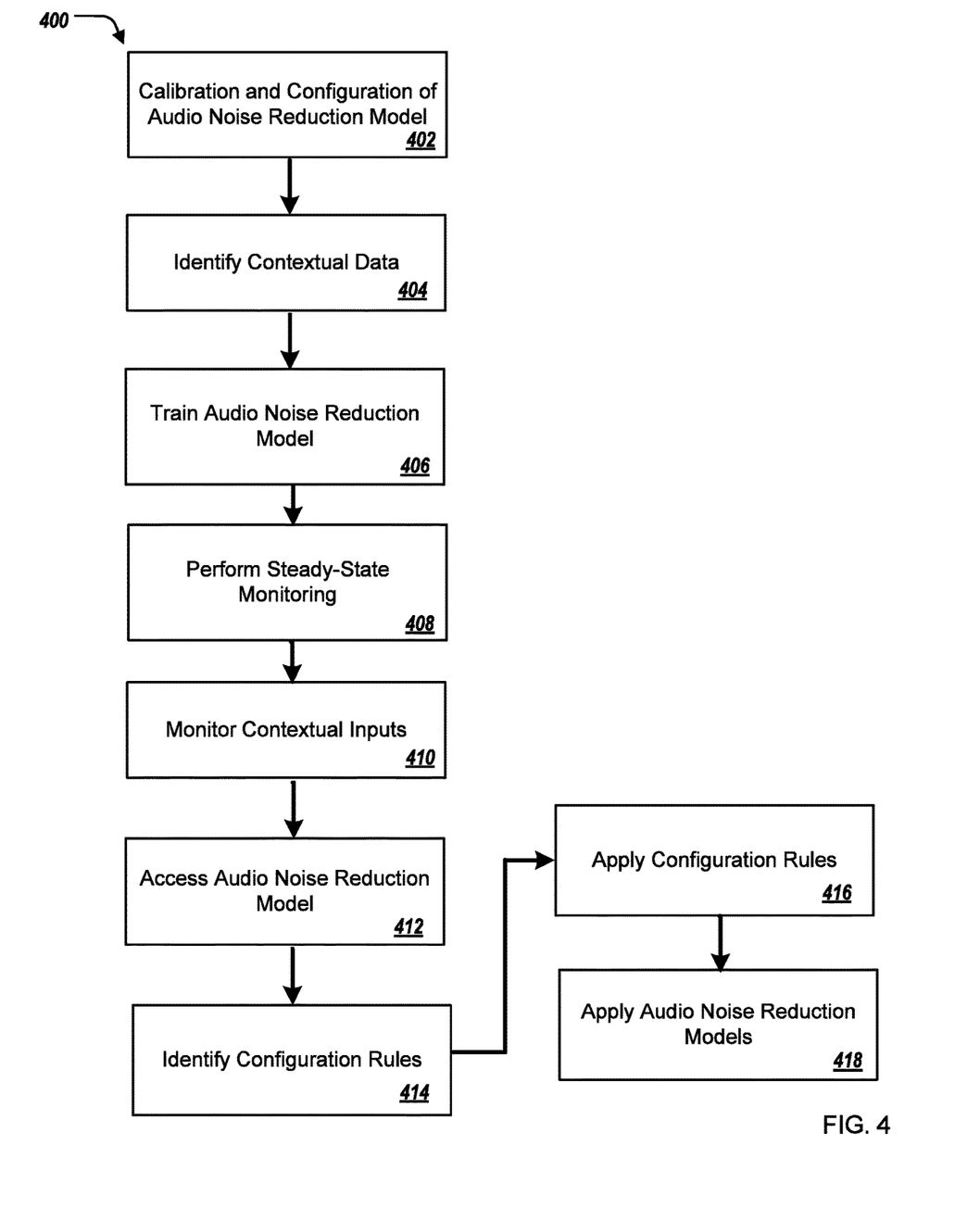
FIG. 4 illustrates a method for selecting audio noise reduction models for non-stationary noise suppression in an information handling system.

FIG. 4 illustrates a flowchart depicting selected elements of an embodiment of a method 400 for selecting audio noise reduction models for non-stationary noise suppression in an information handling system. The method 400 may be performed by the information handling system 100, the information handling system 202 and/or the audio noise reduction selection computing module 206, and with reference to FIGS. 1-3. It is noted that certain operations described in method 400 may be optional or may be rearranged in different embodiments.

The audio noise reduction selection computing module 206 can perform, at a first time, a calibration and configuration of the audio noise reduction selection model 210 (402). The audio noise reduction selection computing module 206 can identify contextual data 212 associated with the contextual inputs 213 of the information handling system 202 (404). In some examples, the contextual data 212 can include such contextual data as user settings contextual data, system settings contextual data, and environment settings contextual data. The audio noise reduction selection computing module 206 can train, based on the contextual data 212, the audio noise reduction selection model 210 (406). In some examples, the audio noise reduction selection computing module 206 can generate, based on the contextual data 212 identified at the first time, a configuration policy 214 that includes configuration rules 216. In some examples, the configuration rules 216 are rules for automatically performing computer-implemented actions for performing computer-implemented actions for selection of a combination of audio noise reduction models 209 executing on the information handling system 202 to reduce combinations of non-stationary noise sources 204 associated with the information handling system 202.

The audio noise reduction selection computing module 206 can perform, at a second time after the first time, a steady-state monitoring of the information handling system 202 (408). The audio noise reduction selection computing module 206 can monitor the contextual inputs 213 of the information handling system 202 (410). The audio noise reduction selection computing module 206 can, in response to monitoring the contextual inputs 213, access the audio noise reduction selection model 210 including the configuration policy 214 (412). The audio noise reduction selection computing module 206 can further identify one or more of the configuration rules 216 based on the monitored contextual inputs 213 (414). The audio noise reduction selection computing module 206 can apply the configuration rules 216 to the information handling system 202 (416). In some examples, the audio noise reduction selection computing module 206 can apply configuration rules 216 to perform one or more of the computer-implemented actions to select a particular combination of audio noise reduction models 209 executing on the information handling system 202. The audio noise reduction selection computing module 206 can apply the particular combination of audio noise reduction models 209 to reduce a particular combination of non-stationary noise sources 204 associated with the information handling system 202 (418).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for selecting audio noise reduction models for non-stationary noise suppression in an information handling system, comprising:
    performing at a first time, a calibration and configuration of an audio noise reduction selection model, including:
        identifying contextual data associated with contextual inputs to the information handling system, the contextual data including user settings contextual data, system settings contextual data, and environmental settings contextual data;
        training, based on the contextual data, the audio noise reduction selection model, including generating a configuration policy including configuration rules, the configuration rules for performing computer-implemented actions for selection of a combination of audio noise reduction models executing on the information handling system to reduce combinations of non-stationary noise sources associated with the information handling system;
    performing, at a second time, a steady-state monitoring of the information handling system, including:
        monitoring the contextual inputs of the information handling system, including:
            identifying a non-stationary noise source associated with an additional information handling system that is in communication with the information handling system;

receiving, by the information handling system, the non-stationary noise source associated with the additional information handling system; and in response to monitoring the contextual inputs:
  i) accessing the audio noise reduction selection model including the configuration policy,
  ii) identifying one or more of the configuration rules based on the monitored contextual inputs, including a particular configuration rule of the one or more of the configuration rules that is associated with the non-stationary noise source associated with the additional information handling system,
  iii) applying the one or more configuration rules to perform one or more of the computer-implemented actions to select a particular combination of audio noise reduction models executing on the information handling system, and
  iv) applying the particular combination of audio noise reduction models to reduce a particular combination of non-stationary noise sources associated with the information handling system.

2. The computer-implemented method of claim 1, wherein applying the particular combination of audio noise reduction models to reduce the particular combination of non-stationary noise sources associated with the information handling system includes applying the particular combination of audio noise reduction models to perform noise cancellation of the particular combination of non-stationary noise sources.

3. The computer-implemented method of claim 1, wherein applying the particular combination of audio noise reduction models to reduce the particular combination of non-stationary noise sources associated with the information handling system includes applying the particular combination of audio noise reduction models to perform input noise cancellation of the particular combination of non-stationary noise sources.

4. The computer-implemented method of claim 1, wherein applying the particular combination of audio noise reduction models to reduce the particular combination of non-stationary noise sources associated with the information handling system includes applying the particular combination of audio noise reduction models to perform output noise cancellation of the particular combination of non-stationary noise sources.

5. The computer-implemented method of claim 1, wherein monitoring the contextual inputs includes identifying a location of the information handling system.

6. The computer-implemented method of claim 1, wherein monitoring the contextual inputs including identifying a current time.

7. The computer-implemented method of claim 1, wherein monitoring the contextual inputs includes identifying environment ambient noise levels.

8. The computer-implemented method of claim 1, wherein monitoring the contextual inputs includes identifying audio input source.

9. The computer-implemented method of claim 1, wherein monitoring the contextual inputs includes identifying a computer-application being executed by the information handling system.

10. The computer-implemented method of claim 1, wherein each audio noise reduction model reduces a particular non-stationary noise source associated with the information handling system.

11. An information handling system comprising a processor having access to memory media storing instructions executable by the processor to perform operations comprising, comprising:
  performing, at a first time, a calibration and configuration of an audio noise reduction selection model, including:
    identifying contextual data associated with contextual inputs to the information handling system, the contextual data including user settings contextual data, system settings contextual data, and environmental settings contextual data;
    training, based on the contextual data, the audio noise reduction selection model, including generating a configuration policy including configuration rules, the configuration rules for performing computer-implemented actions for selection of a combination of audio noise reduction models executing on the information handling system to reduce combinations of non-stationary noise sources associated with the information handling system;
  performing, at a second time, a steady-state monitoring of the information handling system, including:
    monitoring the contextual inputs of the information handling system, including:
      identifying a non-stationary noise source associated with an additional information handling system that is in communication with the information handling system;
      receiving, by the information handling system, the non-stationary noise source associated with the additional information handling system; and
    in response to monitoring the contextual inputs:
      i) accessing the audio noise reduction selection model including the configuration policy,
      ii) identifying one or more of the configuration rules based on the monitored contextual inputs, including a particular configuration rule of the one or more of the configuration rules that is associated with the non-stationary noise source associated with the additional information handling system,
      iii) applying the one or more configuration rules to perform one or more of the computer-implemented actions to select a particular combination of audio noise reduction models executing on the information handling system, and
      iv) applying the particular combination of audio noise reduction models to reduce a particular combination of non-stationary noise sources associated with the information handling system.

12. The information handling system of claim 11, wherein applying the particular combination of audio noise reduction models to reduce the particular combination of non-stationary noise sources associated with the information handling system includes applying the particular combination of audio noise reduction models to perform noise cancellation of the particular combination of non-stationary noise sources.

13. The information handling system of claim 11, wherein applying the particular combination of audio noise reduction models to reduce the particular combination of non-stationary noise sources associated with the information handling system includes applying the particular combination of audio noise reduction models to perform input noise cancellation of the particular combination of non-stationary noise sources.

14. The information handling system of claim 11, wherein applying the particular combination of audio noise reduction models to reduce the particular combination of non-stationary noise sources associated with the information handling system includes applying the particular combination of audio noise reduction models to perform output noise cancellation of the particular combination of non-stationary noise sources.

15. The information handling system of claim 11, wherein monitoring the contextual inputs includes identifying a location of the information handling system.

16. The information handling system of claim 11, wherein monitoring the contextual inputs including identifying a current time.

17. The information handling system of claim 11, wherein monitoring the contextual inputs includes identifying environment ambient noise levels.

18. The information handling system of claim 11, wherein monitoring the contextual inputs includes identifying audio input source.

19. The information handling system of claim 11, wherein monitoring the contextual inputs includes identifying a computer-application being executed by the information handling system.

20. A non-transitory computer-readable medium storing software comprising instructions executable by one or more computers which, upon such execution, cause the one or more computers to perform operations comprising:
    performing, and at a first time, a calibration and configuration of an audio noise reduction selection model, including:
        identifying contextual data associated with contextual inputs to a information handling system, the contextual data including user settings contextual data, system settings contextual data, and environmental settings contextual data;
        training, based on the contextual data, the audio noise reduction selection model, including generating a configuration policy including configuration rules, the configuration rules for performing computer-implemented actions for selection of a combination of audio noise reduction models executing on the information handling system to reduce combinations of non-stationary noise sources associated with the information handling system;
    performing, at a second time, a steady-state monitoring of the information handling system, including:
        monitoring the contextual inputs of the information handling system, including:
            identifying a non-stationary noise source associated with an additional information handling system that is in communication with the information handling system;
            receiving, by the information handling system, the non-stationary noise source associated with the additional information handling system; and
        in response to monitoring the contextual inputs:
            i) accessing the audio noise reduction selection model including the configuration policy,
            ii) identifying one or more of the configuration rules based on the monitored contextual inputs, including a particular configuration rule of the one or more of the configuration rules that is associated with the non-stationary noise source associated with the additional information handling system,
            iii) applying the one or more configuration rules to perform one or more of the computer-implemented actions to select a particular combination of audio noise reduction models executing on the information handling system, and
            iv) applying the particular combination of audio noise reduction models to reduce a particular combination of non-stationary noise sources associated with the information handling system.

* * * * *